(12) United States Patent
Li et al.

(10) Patent No.: US 10,949,460 B2
(45) Date of Patent: Mar. 16, 2021

(54) PRODUCT INDEXING METHOD AND SYSTEM THEREOF

(71) Applicant: VISENZE PTE LTD, Singapore (SG)

(72) Inventors: Guangda Li, Singapore (SG); Zheng Song, Singapore (SG); Fan Xu, Singapore (SG)

(73) Assignee: VISENZE PTE LTD, Singapore (SG)

( * ) Notice: Subject to any disclaimer, the term of this patent is extended or adjusted under 35 U.S.C. 154(b) by 0 days.

(21) Appl. No.: 15/553,539

(22) PCT Filed: Feb. 24, 2015

(86) PCT No.: PCT/SG2015/000054
§ 371 (c)(1),
(2) Date: Aug. 24, 2017

(87) PCT Pub. No.: WO2016/137390
PCT Pub. Date: Sep. 1, 2016

(65) Prior Publication Data
US 2018/0032545 A1 Feb. 1, 2018

(51) Int. Cl.
*G06F 16/58* (2019.01)
*G06K 9/32* (2006.01)
(Continued)

(52) U.S. Cl.
CPC ........ *G06F 16/5838* (2019.01); *G06F 16/583* (2019.01); *G06F 16/5846* (2019.01);
(Continued)

(58) Field of Classification Search
CPC .. G06F 16/5854; G06F 16/51; G06F 16/5838; G06F 16/5846; G06Q 30/0643; G06K 9/3241; G06K 9/72
See application file for complete search history.

(56) References Cited

U.S. PATENT DOCUMENTS 8,438,163 B1 * 5/2013 Li ................... G06K 9/00536
707/737
8,560,517 B2 10/2013 Yang et al.
(Continued)

FOREIGN PATENT DOCUMENTS

EP 2838054 A2 2/2015
JP 59184976 A 10/1984
(Continued)

OTHER PUBLICATIONS

International Search Report dated May 19, 2015 in connection with International Application No. PCT/SG2015/000054, 4 pages.
(Continued)

*Primary Examiner* — Kenny A Cese
(74) *Attorney, Agent, or Firm* — Baker & McKenzie LLP

(57) ABSTRACT

According to various embodiments, the present invention provides a product indexing method including receiving product data of a product, the product data comprising at least an image, such that the image includes a product image of the product and a context image which provides the context that the product may be in, such that the context image includes at least one non-product image. Product indexing method further includes identifying the product image, identifying the context image from the image, verifying the product in the product image based on the context image, extracting the product image and indexing the product image. According to various embodiment, the present invention provides a product indexing system for the product indexing system.

16 Claims, 8 Drawing Sheets

(51) Int. Cl.
*G06F 16/583* (2019.01)
*G06K 9/72* (2006.01)

(52) U.S. Cl.
CPC ......... *G06K 9/3241* (2013.01); *G06K 9/3258* (2013.01); *G06K 9/72* (2013.01)

(56) References Cited

U.S. PATENT DOCUMENTS

| | | | |
|---|---|---|---|
| 8,988,556 B1* | 3/2015 | Karakotsios | H04N 5/23229 348/231.2 |
| 2011/0191336 A1 | 8/2011 | Wang et al. | |
| 2011/0251903 A1* | 10/2011 | Ryu | G06Q 30/00 705/14.73 |
| 2013/0004017 A1 | 1/2013 | Medasani et al. | |
| 2014/0052555 A1* | 2/2014 | MacIntosh | G07G 1/0036 705/23 |
| 2014/0279242 A1* | 9/2014 | Staicut | G06Q 30/0623 705/26.61 |
| 2014/0314313 A1* | 10/2014 | Kennedy | G06K 9/00369 382/165 |
| 2015/0363660 A1* | 12/2015 | Vidal | G06F 16/532 382/173 |

FOREIGN PATENT DOCUMENTS

| | | |
|---|---|---|
| JP | 2006331131 A | 12/2006 |
| WO | 2013109625 A1 | 7/2013 |

OTHER PUBLICATIONS

Written Opinion of the International Searching Authority dated May 19, 2015 in connection with International Application No. PCT/SG2015/000054, 4 pages.

C. Galleguillos et al., "Context Based Object Categorization: A Critical Survey", Computer Vision and Image Understanding, Elsevier, 2010, www.elsevier.com/locatecviu, 11 pages.

Office Action dated Feb. 27, 2019 in connection with Japanese Application No. 2017-545663, 6 pages.

* cited by examiner

PRODUCT INDEXING METHOD AND SYSTEM THEREOF

CROSS-REFERENCE TO RELATED APPLICATION(S)

The present application claims priority under 35 U.S.C. 365 to International Patent Application No. PCT/SG2015/000054 filed Feb. 24, 2015, entitled "PRODUCT INDEXING METHOD AND SYSTEM THEREFOR", which is herein incorporated by reference in entirety.

TECHNICAL FIELD

The present invention relates to a product indexing method and a system thereof, e.g. a product indexing method and system for indexing of commercial product catalogue.

BACKGROUND

Electronic commerce (e-commerce) has been growing explosively in recent years. Numerous kinds of products such as clothes, groceries and electronics are being sold on the electronic commerce websites and system which can efficiently search the desired product are necessary for the buyers. While text search shows limited capability in describing the search intention of the buyers, visual search, which let the user upload a query image to express their search intention, has been proposed. Visual search can greatly improve the user search experience, especially for the mobile users.

Specifically, a visual search system may be used to extract visual features from user's query images and search the visual features from a product visual feature index. To build the product visual feature index, traditional visual feature indexing systems may be used to extract the same visual features directly from the product images, e.g. from a product catalogue, and then apply certain indexing and compression method to generate the product visual feature index. However, the product search system needs to handle the noise and uncontrolled view angles of both query and product images. This is because, for product images, the images may be of low quality, the product in the product image may come in many possible view angles, and/or in a cluttered background (often as part of a human). Similarly, the query images may have the same issues or may have even higher variations in the noise and uncontrolled view angles.

When the query/product image is noisy, the user's search intention may not be fully satisfied if traditional visual feature indexing systems are used. For example, query/product images may be captured in certain environment having features that may not be part of the product image visual index, e.g. the query/product image of a bag may be captured when carried by a person. In such cases, there may be significant differences between the visual feature of the query image and the product image, i.e. the image of the person is different from the query image of the bag. Therefore, this may result in failure of retrieving the product.

In another example, query/product images may be post-processed with artificial effects such as captions, text boxes, decorations and image mosaics. Such post-processing may also pollute the visual feature and make certain product unable to be found by visual search.

In another example, query/product images may be taken in a different view angles, The difference in view angles of the product between the query image and the product images may affect quality of visual search results.

Therefore, it is necessary to have an reliable and effective indexing system so that the user is able to efficiently search for a product and have a more enjoyable search experience.

It is thus an object of the present invention to try to alleviate the aforementioned problems. While it is beneficial to overcome the issues above, it should be noted that there are numerous product categories in electronic commerce and therefore any solution to alleviate the aforementioned problems should be robust enough to handle the different product categories.

SUMMARY

According to various embodiments, the present invention provides a product indexing method including receiving product data of a product, the product data comprising at least an image, such that the image includes a product image of the product and a context image which provides the context that the product may be in, such that the context image includes at least one non-product image. Product indexing method further, includes identifying the product image, identifying the context image from the image, verifying the product in the product image based on the context image, extracting the product image and indexing the product image.

According to various embodiments, the method further include determining a product category of the product based on the product data, such that the product image may be identified based on the product category.

According to various embodiments, the method may further include generating a product prediction score, where the product category may be determined based on the product prediction score.

According to various embodiments, the production prediction score may include a text prediction score and/or an image prediction score.

According to various embodiments, the product data may include a product text of the product, such that the product category may be determined based on the product text.

According to various embodiments, the product text may include a product name of the product, such that the product category may be determined based on the product name.

According to various embodiments, the product text may include a product description of the product, such that the product category may be determined based on the product description.

According to various embodiments, the product category may be determined based on the product image.

According to various embodiments, the product image may be identified based on the product category.

According to various embodiments, the method may further include determining the position of the product image within the image.

According to various embodiments, the method may further include determining the position of the context image within the image.

According to various embodiments, the method may further include identifying a relationship between the product image and the context image.

According to various embodiments, identifying the relationship may include determining the spatial relationship between the product image and the context image.

According to various embodiments, the method may further include defining the product image.

According to various embodiments, the method may further include refining the defined product image.

According to various embodiments, the method may further include identifying a viewpoint of the product in the product image.

According to various embodiments, the method may further include orientating the product image to match a pre-defined viewpoint of the product image.

According to various embodiments, the pre-defined viewpoint of the product image may be defined by the product category.

According to various embodiments, the method may further include generating an another viewpoint of the product.

According to various embodiments, the another viewpoint may be generated based on a pre-defined viewpoint of the product by the product category.

According to various embodiments, indexing the product image may include indexing the viewpoint and/or another viewpoint of the product image.

According to various embodiments, indexing of the product image may be based on the product category.

According to various embodiment, the present invention provides a product indexing system having a server configured to receive product data of a product, the product data having at least an image, such that the image may include a product image of the product and a context image which provides the context that the product may be in, such that the context image may include at least one non-product image, a product identification module configured to identify the product image, a context identification module configured to identify the context image in the image, a verification module configured to verify the product image based on the context image, an extraction module configured to extract the product image from the image, an indexing module configured to select and index the product image.

According to various embodiments, the system may further include a plurality of product categories, such that a product category of the product may be determined based on the product data, and such that the product image may be identified based on the product category.

According to various embodiments, the system may further include a product prediction score, such that the product category may be determined based on the product prediction score.

According to various embodiments, the production prediction score may include a text prediction score and/or an image prediction score.

According to various embodiments, the product category may be determined based on a product text and/or a product image of the product data.

According to various embodiments, the product data may include at least one of a product name or a product description, such that the product category may be determined based on at least one of the product name or the product description.

According to various embodiments, each of the product category may include a product detection module, such that the product detection module of the product category may be configured to identify the product image.

According to various embodiments, the product detection module may be configured to identify the position of the product image and/or the context image within the image.

According to various embodiments, the verification module may be configured to identify a relationship between the product image and the context image.

According to various embodiments, the verification module may include a spatial relationship module configured to verify the spatial relationship between the product image and the context image.

According to various embodiments, the system may further include a defining module configured to define the product image.

According to various embodiments, the system may further include a refining module configured to refine the defined product image.

According to various embodiments, the system may further include a viewpoint managing module configured to perform at least one of the following: identify a viewpoint of the product image, generate an another viewpoint of the product or orientate the product image to match a pre-defined viewpoint of the product image.

According to various embodiments, the product category may include pre-define viewpoints, such that viewpoint managing module may be configured to generate and/or orientate a viewpoint of the product based on the pre-defined viewpoints of the product category.

According to various embodiments, the system may further include a viewpoint indexing module configured to index the viewpoint and/or another viewpoint of the product image.

The present invention aims to provide a more accurate product feature indexing system in images or video for a search based on visual search queries.

DETAILED DESCRIPTION

Figure 1:
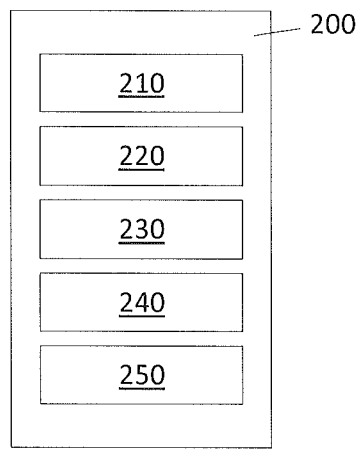
FIG. 1 shows an exemplary product indexing system.

FIG. 1 shows a product indexing system 100 having a server 200 configured to receive product data of a product. Product data includes at least an image, such that the image includes a product image of the product and a context image which provides the context that the product is in. Product indexing system 100 includes a product identification module 210 configured to identify the product image, a context identification module 220 configured to identify the context image in the image, a verification module 230 configured to verify the product image based on the context image, an extraction module 240 configured to extract the product image from the image, and an indexing module 250 configured to index the product image. Indexed product image may form a product visual feature index. Product feature visual index may be an index used to index product catalogues to facilitate a search using visual search query.

Figure 2:
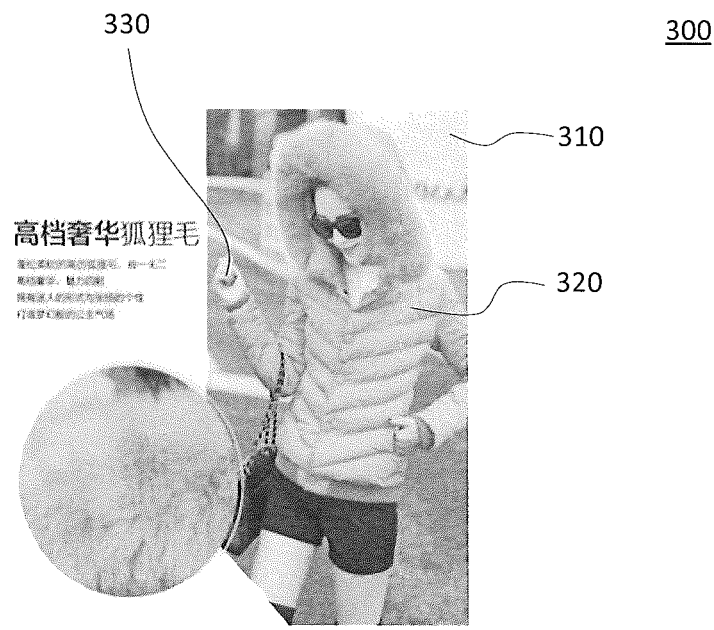
FIG. 2 shows an example of product data.

FIG. 2 shows an example of product data 300. Product data 300 may include at least an image 310. Image 310 may include a product image 320 of the product and a context image 330 which provides the context that the product is in.

Figure 3:
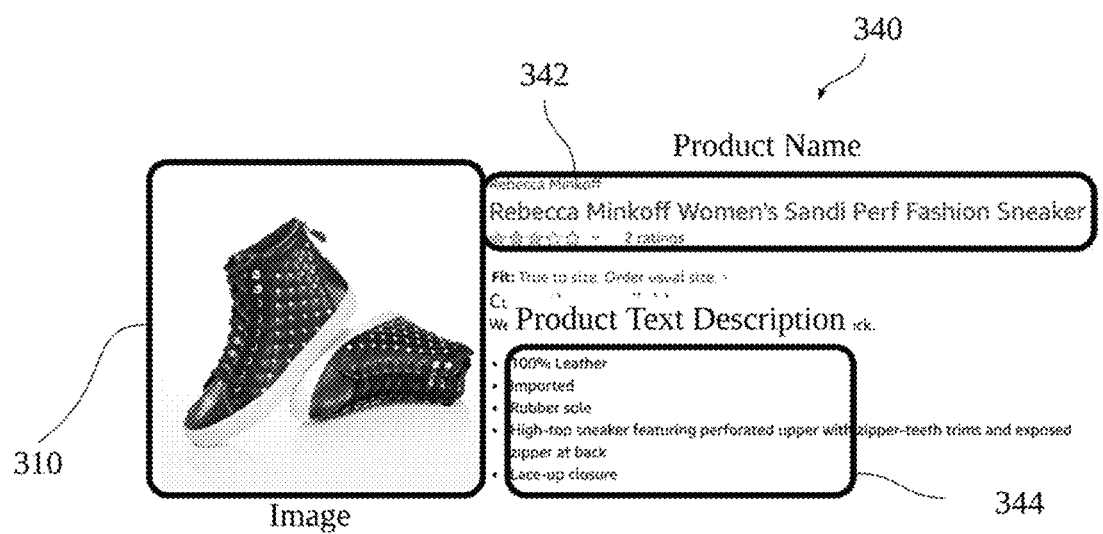
FIG. 3 shows another example of product data.

FIG. 3 shows another example of product data 302. Product data 302 may include a product text 340 of the product. Product text 340 may include a product name 342 and/or a product description 344 of the product. Product name 342 may be a brand, a model, name etc. of the product which may be provided by the product company. Product description 344 may be a product specification or write-up of the product. Product data 302 may be received from a product company. Product data 302 may be in the form of a digital product catalogue.

Figure 4:
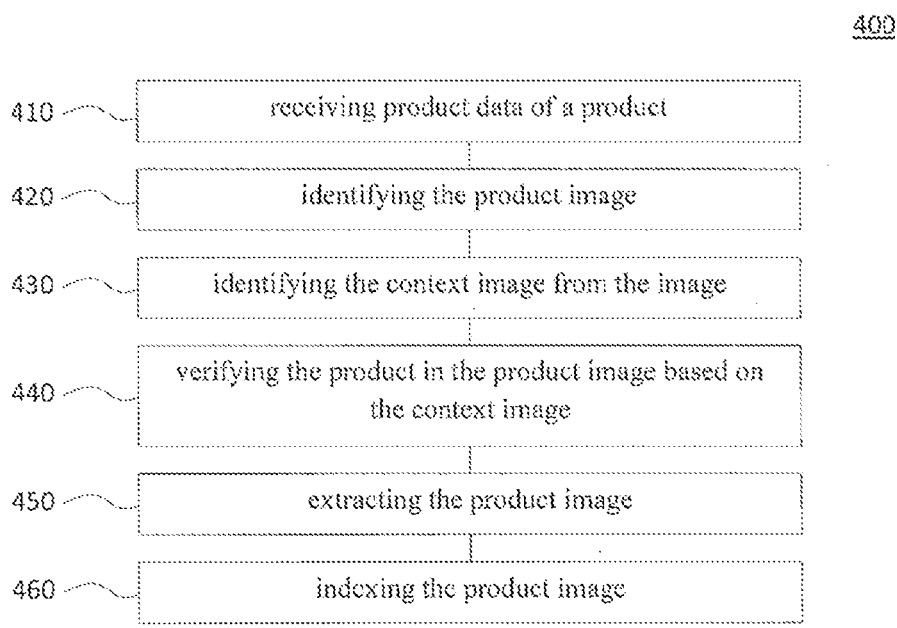
FIG. 4 shows an exemplary product indexing method for the product indexing system of FIG. 1.

FIG. 4 shows a product indexing method 400 for the product indexing system 100. Product indexing method 400 includes receiving product data 300 of a product in 410. Product data 300 has at least an image 310. Image 310 has a product image 320 of the product and a context image 330 which provides the context that the product is in. Context image 330 includes at least one non-product image. Product indexing method 400 includes identifying the product image 320 in 420, identifying the context image 330 from the image 310 in 430, verifying the product in the product image 320 based on the context image 330 in 440, extracting the product image 320 in 450 and indexing the product image 320 in 460.

When the server 200 receives product data 300, the server 200 may analyse the product data 300 to identify the product in the product data 300. Referring to FIG. 2, the server 200 may use the product identification module 210 to identify the product image 320 of the product, e.g. coat. Server 200 may use the context identification module 220 to identify the context image 330 in the image 310, e.g. face, hand. Server 200 may use the verification module 230 to verify that the product image 320, e.g. coat, based on the context image 330 identified e.g. hands and face are adjacent the coat. Once the product image 320 is identified, the server 20 may extract the product image 320 from the image 310 using the extraction module 240 and index the product image 320 using the indexing module 250. Extracted product image 320 may be used to form the product visual feature index.

As described, to index a product data 300, the product that the product data 300 represents may be identified for indexing to be carried out. Thereafter, the product image 320 of the product may be identified, selected and extracted to be used for the product visual feature index.

Figure 5:
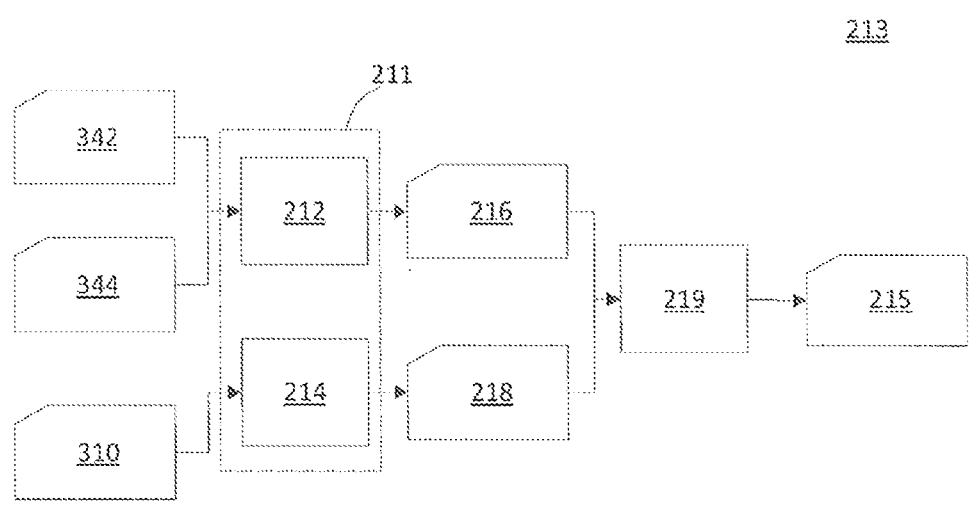
FIG. 5 shows a schematic diagram of an exemplary embodiment of the product identification module.

Product identification module 210 may include a product prediction module 211 configured to predict a product category (shown below) of the product in the product data 300. Product prediction module 211 may be used to predict the product image 320 in the image 310. FIG. 5 shows a schematic diagram of an exemplary method 213 of a product prediction module 211. Product prediction module 211 may be configured to predict the type of product in the image 310. Product prediction module 211 may include text prediction module 212 and/or image prediction module 214. Text prediction module 212 and/or image prediction module 214 may include pretrained text classification models. Text prediction module 212 and image prediction module 214 may be conventional text-based and image-based prediction models respectively, e.g. machine learning algorithm. As shown in FIG. 5, the product name 342 and/or the product description 344 of the product text 340 may be predicted by the text prediction module 212. Image 310 may be predicted by the image prediction module 214.

Product indexing system 100 may include a product prediction score 215. Product prediction module 211 may be used to analyse the product image 320 to obtain the product prediction score 215. Product prediction score 215 may be at least one number indicating the probability of the product predicted by product prediction module 211 to belong to a product category. E.g. referring to FIG. 3, the product prediction module may predict the product image 320 to have a product prediction score of 85% as a shoe and maybe 40% as a slipper as the product has a high resemblance of a shoe. Product prediction module may be configured to analyse a product database having product data of a plurality of products to provide a plurality of product prediction scores for the plurality of products.

Product prediction score 215 may include a text prediction score 216 and/or an image prediction score 218. Product prediction module 211 may be configured to use supervised learning modules to generate text-based and visual-based prediction modules. Text prediction score 216 may be obtained from the text prediction module 212 when the product data 300 is being analysed by the text prediction module 212. Image prediction score 218 may be obtained from the image prediction module 214 when the product data 300 is analysed by the image prediction module 214. Product prediction score 215 may be obtained by aggregating the text prediction score 216 and the image prediction score 218 using a score aggregating module 219. Text prediction score 216 may be factored by a text prediction weight to obtain a weighted text prediction score. Image prediction score may be factored by a image prediction weight to obtain a weighted image prediction score. Text prediction weight and/or image prediction weight may be configured empirically. Product category (as explained below) of a product may be determined based on the product prediction score.

Product indexing system 100 may include a plurality of product categories. Product category of the product may be determined based on product data 300. Product category of a product may be determined based on the product prediction score 215. Based on the results of the product prediction module 211, e.g. product prediction score 215, the product category of the product may be identified. Product prediction score 215 obtained from the product data 300 may be used to predict the product category of the product from the plurality of product categories. Based on the product prediction score 215, the server 200 may identify and select the product category that is the most relevant to the product, e.g. highest product prediction score for the product category, from the plurality of product categories for the product. As mentioned above, the product prediction score 215 may include text prediction score 216 and/or image prediction score 218. Therefore, the product category may be identified and selected based on the product text and/or image of the product data 300. In another words, the product category may be determined based on at least one of the product name 342 or the product description 344. As the text prediction score 216 is a component of the product prediction score 215, the product category may be determined based on the product text 340 and/or the product image 320 of the product data 300.

Plurality of product categories may include a plurality of product detection modules. Each of the product category may include a product detection module. Each of the plurality of product detection modules may be pre-defined for each category of product, e.g. product detection module for clothing, footwear, or handbags etc. Product detection module may be configured to extract information of the product from the image 310. Product detection module may be configured to extract the position of the product image 320 in the image 310.

Product detection module may include an image detection module. Product detection module may include the text prediction module 212. Text prediction module 212 may be configured to extract a text feature representation from the product data 300. Image detection module may be configured to extract an image feature representation from the product data 300. Based on the product detection module and the text feature representation and/or image feature representation, parametric models of the product may be learned by supervised learning methods e.g. regression, SVM, neural network, etc. Multiple parametric models may be learned for both the text feature representation and/or the image feature representation by changing the feature representations and learning methods. Product detection module may be a labeled product dataset. Product detection module may be a pre-trained product detection module configured to detect a product in the product image. Text prediction module may include pretrained text classification models. Text prediction module 212 may be conventional text-based prediction models respectively, e.g. machine learning algorithm.

Product detection module of the product category may be configured to identify the product image. Each of the plurality of product categories may include a product detection module. Product detection module may be customised for the respective product category. For example, if the product is a shoe, the product category may be "footwears". Product detection module for "footwears" may be configured to detect images that are relevant to shoes, slippers etc. Unlike the product prediction module 211, the product detection module has more product specific detection algorithm to detect or identify the product image within the image. Therefore, the incorporation of the product detection module may enhance the quality of the product image and hence enhance the quality of the product index. Product detection module may include visual detection models which are built using shape models. Detection model may be utilised with Haar feature. Histogram of Oriented Gradient Feature Convolutional Neural Network as image descriptor. Product indexing system 100 may include an image position identification module configured to identify the position of the product image and/or the context image within the image. Image position identification module may be independent from the product detection module.

Product detection module may be configured to identify the position of the product image and/or the context image within the image. Product position of the product in the image 310 may be obtained during the detection of the product in the image 310 by the product detection module. Product category may include visual detection models like shoes, coat, trousers, etc. Such detection models may be built using shape models. Detection models may be used with Haar feature. Histogram of Oriented Gradient Feature Convolutional Neural Network as image descriptor.

Product category may include a spatial relationship module having conditions defining the spatial relationship between the product image 320 and the context image 330. Spatial relationship module for each of the plurality of product categories may be unique to the nature of the product. As such, the conditions in the spatial relationship module for each of the plurality of product categories may be different from each other.

There may be a possibility that the product category of the product may not be determined. As mentioned, the product prediction module 211 may be used to predict the product category of the product. Product prediction module 211 may determine that the product may belong to an undetermined product category in the event that the product category is not determined. A general product category may include a general product category detection module configured to detect the undetermined product. Using the general product category detection module, the product image 320 of the undetermined product may be identified and extracted. Product image 320 of the undetermined product may be indexed by the indexing module 250 as part of the product visual feature index as an "undetermined" index.

Product category may include at least one pre-defined viewpoint for a product. Product detection module may be configured to store pre-defined viewpoints of the product for the respective product category. For example, if the product is a shoe, the pre-defined viewpoints may be a left side view, a right side view and/or a perspective view of the shoe. Product category may include a viewpoint managing module configured to identify the viewpoint of the product in the product image 320. Viewpoint of a product may be a view of the product from a point away from the product, e.g. front side, left side, right side, rear side, perspective side. Viewpoint managing module may be configured to orientate a product image 320 having a viewpoint that is different from the pre-defined viewpoint of product category to align the viewpoint of the product image to that of the pre-defined viewpoint.

Figure 6:
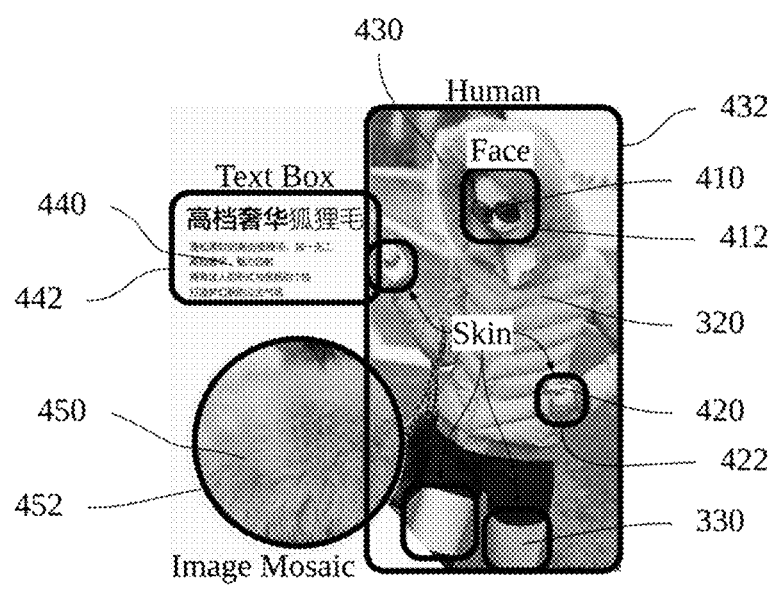
FIG. 6 shows an example of the identification of context images.

Context identification module 220 may be configured to identify the context that the product may be in. For example, for the image 400, e.g. coat, as shown in FIG. 6, the context image 330 may include a face 410, skin 420, human 430, text 440 and rectangular/circular image mosaics 450. Context identification module 220 may include pretrained context models configured to detect context image 330. Context identification module 220 may be configured to perform context identification on the product image 320.

Context image 330 may be common irrelevant content appearing in the image 310 or the product image 320. For example, as shown in FIG. 6, visual models may be constructed for the context objects such as human, face, skin, text, boxed or circled mosaics. These context images 330 may be related to the product but may be irrelevant to the product.

Context identification module 220 may include shape model with edge features descriptors to detect shapes, e.g. human, faces and text. Shape model with edge features descriptors may include Haar Feature, Histogram of Oriented Gradient Feature or Pixel Convolutional Kernels from a Convolutional Neural Network.

Context identification module 220 may use conventional methods, e.g. Gaussian Mixture Model (GMM) of color, to identify colour-related context image 330, e.g. human skin.

Context identification module 220 may include edge, line, circle and corner detectors to predict context image like mosaic boxes/circles. Edge, line, circle and corner detectors, e.g. Hough Transform, may be implemented to detect all high probability boxes, circles/ellipses and generate the boxes, circles/ellipses as an output.

Context image 330 may be areas of the product images that may need to be removed when extracting the product image. Context image 330 may be used for more accurate product category prediction and/or position prediction.

Product images may be selected by the verification module 230 based on the aforementioned results obtained from at least one of the product detection module, the product prediction module 211 and the context identification module 220. Product indexing system 100 may further include a product image selection module configured to select the product image 320. Product image selection module may be independent from the verification module 230.

Information related to the product that is found in the product category, e.g. spatial relationship module, predicted product images from the product prediction module 211 and context image from the context identification module 220 may be fed into the verification module 230. Verification module 230 may analyse all the results together to generate a more accurate result of the product image 320.

Once the context identification module 220 identifies the context image 330, the context image 330 may be used to verify the product image 320 in the image 310. Verification module 230 may be configured to identify a relationship between the product image 320 and the context image 330, e.g. spatial relationship, chronological relationship. Image position identification module may be configured to identify the position of the context image 330 in the image 310. Position of the context image 330 may be obtained during the detection of the product in the image 310 by the image position identification module. Verification module 230 may include a spatial relationship module configured to verify the spatial relationship or positional relationship between the product image 320 and the context image 330. Spatial relationship module may include a visual grammar module having conditions pertaining to the relationship between the product image 320 and the context image 330.

Product indexing system 100 may utilise the results obtained from the product detection module, the product prediction module 211 and the context identification module 220 in the verification of the product image so as to verify the accuracy of the product image 320.

For example, as shown in FIG. 6, the context identification module 220 may have identified a plurality of context images 330, e.g. face 410, skin 420 and human 430, and the position of the plurality of the context images 330. Although, the plurality of context images 330, e.g. the face as well as several parts of the human body, may not be applicable for the product image, i.e. coat, they may be important for inferencing the position of the product image 320.

Visual grammar module may be used to merge the prediction results for at least one of the three modules, i.e. the product detection module, the product prediction module 211 and the context identification module 220. Visual grammar module may contain a spatial relation validation grammar. Visual grammar module may analyse the spatial relations between the position of the product image 320 and the position of the context image 330 and may filter the product image 320 with invalid product-context relation. Visual grammar module may perform refinement to the product image position. Based on the result of the spatial relation analysis, it can be found that although the prediction of the product image 320 is correct, the position of the product image 320 may somehow not be accurate enough. Visual grammar module may verify the product image 320 based on at least one of the context images 330 using linear model, e.g. predict the boundary coordinates of the product image, e.g. coat, from the face box 412 coordinates. Visual grammar module may include prediction parameters which may be manually tuned or learned from existing product detection module to improve the prediction of the product image 320.

Product indexing system 100 may include a product image defining module configured to define the product image 320. Product box and context box may be used to define the product image and the context image respectively as shown in FIG. 6. For example, the context box may include a face box 412 to identify the position of the face 410, a skin box 422 to identify the position of the skin 420, a human box 432 to identify the position of the human 430, a text box 442 to identify the position of the text 440, and the image mosaic box 452 to identify the position of the image mosaic 450. As shown, a box is used to define the area confined within the box and the box may be circular, square or any other shapes used to depict a boundary of the image.

Example of definitions in the visual grammar modules may include:

A product box (not shown in FIG. 6) should be within the image mosaic boxes/circles;

A top clothes box (not shown in FIG. 6) should not exceed the human box 432. Top boundary of top clothes box should not exceed the middle of the face box 412.

Skin area within a product box should not exceed a threshold (the threshold may vary according to the product category). Otherwise 1) if face color is not used for skin prediction then the skin area is considered as invalid (if the skin prediction is inaccurate) 2) if face color is used for skin prediction, then the product box is invalid.

Remove all skin area in the product box since skin area is highly possible to be noise data to the product image.

Product category may define the definitions in the visual grammar module. As such, the visual grammar may vary be changed flexibly according to the product category of the product.

Use of the context image 330, i.e. photo context information, may be a key component in the identification of product image 320. Model based context prediction may be more general comparing to similar image processing approaches. Models can be constructed about common irrelevant context information such as text, boxed or circled mosaics and human as shown in FIG. 6.

Context identification module may detect time relevant data, e.g. time of the day, season of the year. Time relevant data may be used to identify products which may be relevant to the time of the day or season of the year. For example, snow may indicate that the clothes worn by a person may be winter clothes. As shown, context image may be a contextual background image. In another example, the contextual background image may be at least one kitchen item, e.g. a kettle, basin, and the product image may be compared using visual grammar which is in the context of kitchen items. Visual grammar may include object-to-scene and/or object-to-object relationship conditions.

Context image may be removed when the product image is extracted for indexing purposes as will be explained later.

As mentioned earlier, the viewpoints required for a product may be pre-defined in the product category. For example, for shoes, the mirrored version of the side view may be required to be generated and indexed (refer to FIG. 7(d)).

Product image 320 may be extracted and fed into the viewpoint managing module to generate different product viewpoints. Viewpoint managing module may be designed according to different product categories since different product has different geometric features, e.g. symmetric, rotate-invariant, etc. Viewpoint managing module may utilise shape model to predict the required viewpoint of the product. In this way, the product indexing system 100 would only incur rather low computation cost.

When the viewpoints of a product are finalised, the viewpoints may be indexed. By generating more viewpoints, the product index of the product may be enhanced and thereby improving the visual index quality of the product.

Products may look different from different viewpoints. Therefore, the viewpoint of the product may need to be further processed in order to obtain a unified search result from variant user queries. If the product position and viewpoint are well predicted, the viewpoint of the product from other viewpoints, like mirrored or rotated views, may be synthesized.

Figure 7:
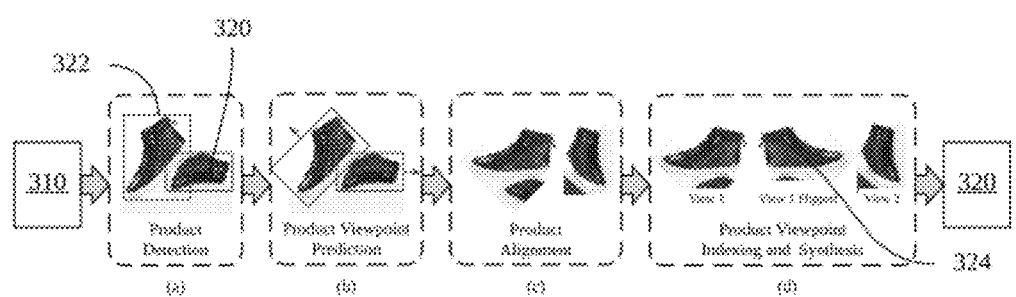
FIG. 7 shows a flowchart of the product image being indexed.

Product image 320 may be identified based on the product category. FIG. 7 shows a flowchart 380 of the product image being indexed. Image 310 may be predicted by the image prediction module 214.

As mentioned earlier, the product detection module may be configured to detect the position of the product image 320 and the viewpoint of the product in image 310. Image position identification module of the product detection module may be used to predict the position of the product in image coordinate. Referring to FIG. 7(a), once the product image 320 is detected, a product image box 322 may be generated to define an image area of the product image 320.

Referring to FIG. 7(b), the viewpoint managing module may be used to detect a viewpoint of the product (indicated by the arrow of the product image box 322). For example, the two shoes can be detected by a 45 degree and a 90 degree rotated shoe model.

Referring to FIG. 7(c), based on the pre-defined viewpoint of the product in the product category, the product images 320 may be extracted along the boundary of the product image box and aligned with the pre-defined viewpoint of the product category for the product. As shown in FIG. 7(c), the product image 320 of the right shoe may be rotated about 90 degree counter-clockwise as defined in the product category. If the product image 320 is already aligned to the pre-defined viewpoint of in the product image, the product image need not be rotated. Once the product images 320 of the product have been obtained, the product images 320 may be indexed as the product visual feature index. As the product image 320 includes a viewpoint of the product, e.g. side view, a viewpoint index may be generated. Product index and/or the viewpoint index may be saved into the product visual feature index.

Referring to FIG. 7(d), the product, e.g. shoe shape models, may have two viewpoints, i.e. a side view and a front view. The viewpoint index may facilitate the search if the search query is also labeled with the viewpoint index.

Depending on the pre-defined viewpoints as required by the product category, other viewpoints may also be generated by the viewpoint managing module. E.g. referring to FIG. 7(d), the viewpoint managing module may generate a mirrored or rotated viewpoint 324 of the product image 320. Most of the electronic commerce product data may not be symmetric and rotation invariant. Therefore, it may be necessary to generate the viewpoints which are useful for the search.

When a product image 320 has be identified and/or refined, visual feature description of the product may be extracted from product image 320. Product category may include visual feature extraction parameters which may also be required for the extraction of the product image 320 since different product category may result in different extraction parameters. A product visual feature index may be built from the product image 320. The final product visual feature index may be built using the product category and the extracted visual features based on common data indexing techniques such as hashing and inverted index. Product Category may be used for visual feature extraction and indexing to provide a more accurate indexing of the product.

Figure 8:
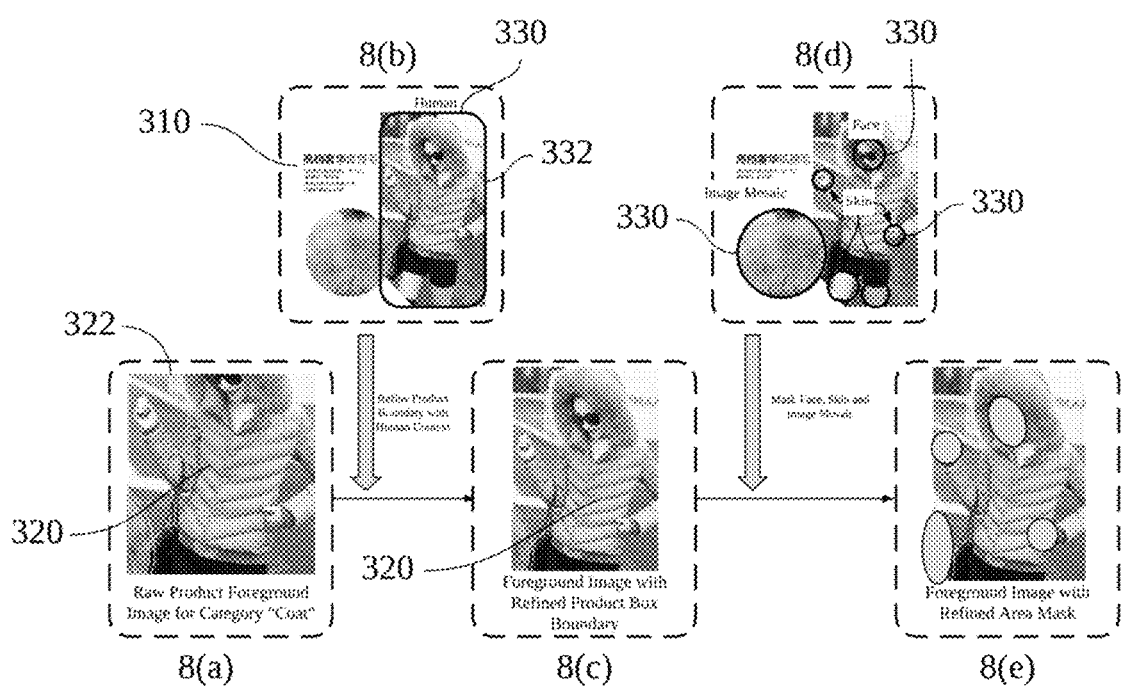
FIG. 8 shows a flowchart of an exemplary method of indexing.

FIG. 8 shows a flowchart of an exemplary method 304 of indexing of the product image 320. As shown in FIG. 8(a), the product image 320 may be predicted from an image 310 using the product prediction module 211, e.g. product prediction module 211 has identified the product image 320 to be a coat. Server 200 may select the product image 320 by generating a product image box 322 around the product image 320. Product prediction score 216 may have been generated by the product prediction module 211. Server 200 may call for the product category for the coat based on the product prediction score 216. Server 200 may activate the product detection module to detect the product in the product image 320. Referring to FIG. 8(b), the server 200 may activate the context identification module 220 to identify the context image 330, e.g. human, in the image 310. Using the verification module 230, the context image 330 may be used to be compared against the product image 320 and verify the product image 320, e.g. using the visual grammar module. Referring to FIG. 8(c), based on the visual grammar, the server 200 may refine the product image 320 by enlarging the product image box 322 to better define and encapsulate the product within the product image box 322. Referring to FIG. 8(d), the context identification module 220 may identify a plurality of context images 330 and may mask the plurality of context images 330 (see FIG. 8(e)). Server 200 may extract the product image 320 using the extraction module 240. Upon extracting the product image 320, the server 200 may remove the plurality of context images 330 from the product image 320 to isolate the product image 330 from the plurality of context images 330, i.e. noise. Thereafter, the product image 320 may be indexed using the indexing module 250 to form the product visual feature index. With the removal of the plurality of context images 330, the accuracy of the product visual feature index for the product may be improved.

Figure 9:
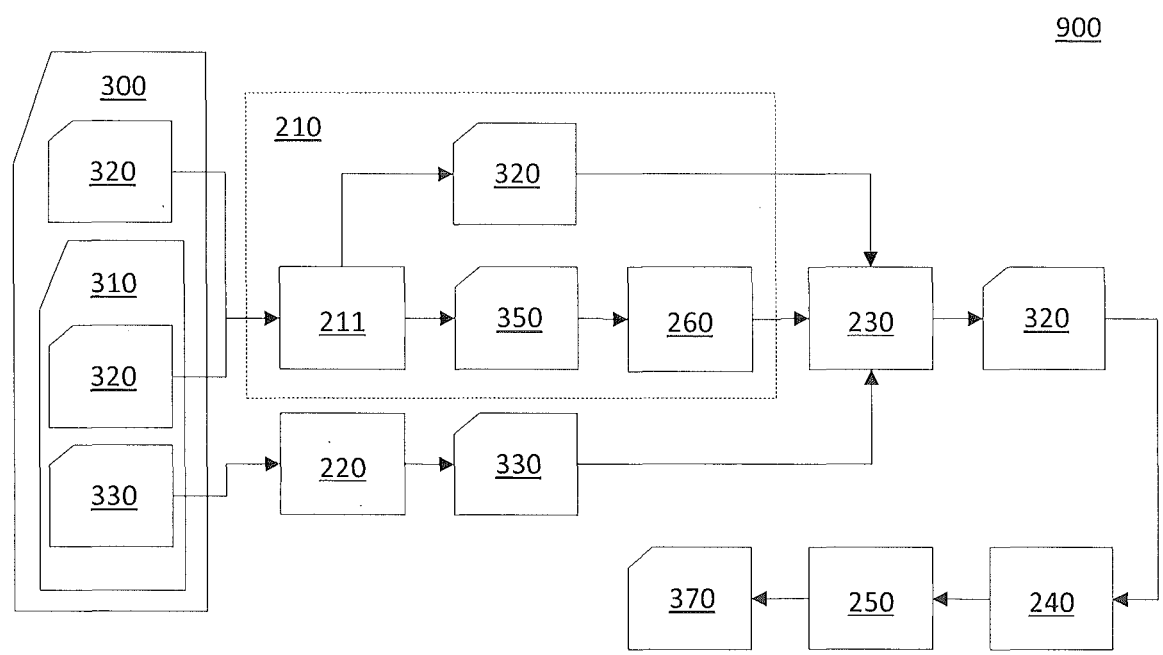
FIG. 9 shows a flowchart of an exemplary a product indexing method.

FIG. 9 shows a flowchart of an exemplary a product indexing method 900. Upon receiving the product data 300, the product identification module 210 may be used to analyse the product data 300 to identify the product image 320. Product image 320 may be identified from the image 310 using the product prediction module 211. Type of product in image 310 may be predicted by the product prediction module 211. Product prediction module 211 may be used to predict the product category 350 of the product. Upon identifying the product category 350, the product detection module 260 related to the product category 350 may be used to identify the product image 320 in the image 310 and for other functions, e.g. determining the viewpoints to be acquired. Context image 330 may be identified by the context identification module 220 from the image 310. Product image 320 may be verified by the verification module 230 by considering the inputs from at least one of the product image 310, the product category 350, and the context image 330. Based on the verification, the product image 320 may be refined and the refined product image 320 may be extracted by the extraction module 240. Product image 320 extracted from the image 310 may then be indexed by the indexing module 250 to obtain the product visual feature index 370.

User search query image may also be processed by the product indexing system 100. Any one of more of the modules described above in the product indexing system 100 may be executed for the user search query image. E.g. viewpoint managing module may mirrored or rotated the image of the user search query.

The invention claimed is:

1. A product indexing method comprising:
   receiving an input image;
   analyzing the input image, the analyzing including:
      identifying a product displayed in the input image;
      selecting a product image from the input image, the selected product image being an image of the identified product displayed in the input image;
      selecting, based on the selected product image, a context image from the input image, the selected context image being one or more sections displayed in the input image other than the product image that provide contextual information for the identified product displayed in the selected product image;
      predicting, based on the identified product, one or more product categories for the identified product from among a plurality of pre-defined product categories, each pre-defined product category covering one or more products, each pre-defined product category having one or more required viewpoints for the one or more covered products in the pre-defined product category, wherein each of the one or more predicted product categories include one or more required viewpoints for the identified product, wherein the predicting of each product category includes:
         generating a product prediction score, the product prediction score representing a probability that the identified product belongs to the predicted product category, the product prediction score including:
            an image prediction score, the image prediction score representing a probability that the selected product image belongs to the predicted product category; and
            a text prediction score, the text prediction score representing a probability that one or more textual information identified in the input image belongs to the predicted product category;
      selecting, from among the one or more predicted product categories, a selected predicted product category, the selected predicted product category being the predicted product category having the highest product prediction score;
   verifying the selected product image to determine whether the selected product image needs to be refined, the verifying based on the selected context image and the predicted product category;
   determine, based on the verifying, whether the selected product image needs to be refined;
   responsive to a determination that the selected product image does not need to be refined:
      identifying a viewpoint of the identified product in the selected product image, the viewpoint of the identified product in the selected product image identified based on a comparison of the selected product image with one or more of the required viewpoints in the predicted product category;
      extracting the selected product image based on the identified viewpoint of the identified product in the selected product image; and
      indexing the extracted product image and the selected predicted product category.

2. The product indexing method of claim 1, further comprising generating a product prediction score, wherein the predicted product category is determined based on the product prediction score.

3. The product indexing method of claim 2, wherein the product prediction score comprises a text prediction score and/or an image prediction score.

4. The product indexing method of claim 1, wherein the input image comprises a product text, the product text being a textual description of the product, wherein the predicted product category is determined based on the product text.

5. The product indexing method of claim 4, wherein one or more of the following apply:
   the product text comprises a product name of the product, wherein the predicted product category is determined based on the product name;
   the product text includes a product description of the product, wherein the predicted product category is determined based on the product description;
   the predicted product category is determined based on the product image; and/or
   the product image is identified based on the predicted product category.

6. The product indexing method of claim 1 further comprising determining a position of the selected product image within the input image.

7. The product indexing method of claim 6, further comprising determining a position of the selected context image within the input image.

8. The product indexing method of claim 1, further comprising identifying a relationship between the selected product image and the selected context image.

9. The product indexing method of claim 8, wherein identifying the relationship comprises determining the spatial relationship between the selected product image and the selected context image.

10. The product indexing method of claim 1, wherein when the verifying indicates that the selected product image needs to be refined:
    refining the selected product image;
    identifying a viewpoint of the identified product in the refined product image, the viewpoint of the identified product in the refined product image identified based on a comparison of the refined product image with one or more of the required viewpoints in the predicted product category;
    extracting the refined product image based on the identified viewpoint of the identified product in the refined product image; and
    indexing the extracted product image.

11. The product indexing method of claim 1, further comprising adjusting an orientation of the selected product image to match one of the required viewpoints in the predicted product category.

12. The product indexing method of claim 1, further comprising generating an another viewpoint of the identified product in the selected product image, the another viewpoint being different from the identified viewpoint of the identified product in the selected product image.

13. The product indexing method of claim 12, wherein the another viewpoint is generated based on one or more of the required viewpoints in the predicted product category.

14. The product indexing method of claim 1, wherein the indexing of the extracted product image comprises indexing the identified viewpoint and/or another viewpoint of the identified product in the selected product image.

15. The product indexing method of claim 1, wherein the indexing of the extracted product image is based on the predicted product category.

16. A product indexing method comprising:
receiving an input image;
analyzing the input image, the analyzing including:
- identifying a product displayed in the input image;
  - selecting a product sub-image from the input image, the selected product sub-image being an image of the identified product displayed in the input image;
  - selecting a context sub-image from the input image, the selected context image being one or more sections displayed in the input image other than the product sub-image that provide contextual information for the identified product displayed in the selected product sub-image;
  - predicting one or more product categories for the identified product, the predicting of each product category including:
    - generating a product prediction score, the product prediction score representing a probability that the identified product belongs to the predicted product category, the product prediction score including:
      - an image prediction score, the image prediction score representing a probability that the selected product image belongs to the predicted product category; and
      - a text prediction score, the text prediction score representing a probability that one or more textual information identified in the input image belongs to the predicted product category;
- selecting, from among the one or more predicted product categories, a selected predicted product category, the selected predicted product category being the predicted product category having the highest product prediction score, the selected predicted product category covering the identified product and one or more other products, the selected predicted product category having one or more required viewpoints for the identified product;
- identifying a first viewpoint of the selected product sub-image based on a comparison of the selected product sub-image with one or more of the required viewpoints in the selected predicted product category;
- generating a second viewpoint of the selected product sub-image, the second viewpoint of the selected product sub-image being different from the first viewpoint of the selected product sub-image; and
- indexing the selected product sub-image, the first viewpoint, and the second viewpoint.

* * * * *